US010242362B2

(12) United States Patent
Burgess et al.

(10) Patent No.: US 10,242,362 B2
(45) Date of Patent: Mar. 26, 2019

(54) SYSTEMS AND METHODS FOR ISSUANCE OF PROVISIONAL FINANCIAL ACCOUNTS TO MOBILE DEVICES

(71) Applicant: Bank of the Ozarks, Little Rock, AR (US)

(72) Inventors: Trevor Burgess, St. Petersburg, FL (US); Marcio deOliveira, Sarasota, FL (US)

(73) Assignee: Bank of the Ozarks, Little Rock, AR (US)

( * ) Notice: Subject to any disclaimer, the term of this patent is extended or adjusted under 35 U.S.C. 154(b) by 725 days.

(21) Appl. No.: 14/921,858

(22) Filed: Oct. 23, 2015

(65) Prior Publication Data

US 2017/0116615 A1    Apr. 27, 2017

(51) Int. Cl.
*G06Q 40/02* (2012.01)
*G06Q 20/40* (2012.01)
(Continued)

(52) U.S. Cl.
CPC ... *G06Q 20/40145* (2013.01); *G06F 16/9017* (2019.01); *G06Q 20/322* (2013.01);
(Continued)

(58) Field of Classification Search
CPC ........ G06Q 10/00; G06Q 20/00; G06Q 30/00; G06Q 40/00
(Continued)

(56) References Cited

U.S. PATENT DOCUMENTS 7,117,529 B1 * 10/2006 O'Donnell ........... G06Q 30/018
   726/6
7,496,531 B1 * 2/2009 Gastineau .............. G06Q 40/00
   705/35

(Continued)

OTHER PUBLICATIONS

Bojinov, H., et al. (2014). Mobile Device Identification via Sensor Fingerprinting. arXiv preprint arXiv:1408.1416.
(Continued)

*Primary Examiner* — Frantzy Poinvil
(74) *Attorney, Agent, or Firm* — Shumaker, Loop & Kendrick, LLP; Jeffrey B. Fabian

(57) ABSTRACT

Systems and methods permit secure and convenient provisional account creation for use in conducting payment transactions. The provisional account does not include sensitive data, thereby mitigating risk to a consumer's financial account if the provisional account were compromised. In one embodiment, a computing device associated with a financial service provider receives customer and customer device information. The provider computing device performs a verification analysis and a fingerprint analysis to authenticate the customer's identity and the customer device authenticity. The provider device also receives an access request message seeking authorization for an identity management service ("IdM") to interface with the provider device. The provider device generates an access decision message indicating an approval or disapproval of an authorization request. If the authorization request is approved, the IdM generates a provisional account and transmits the account number and other information to the provider device and the customer device.

18 Claims, 6 Drawing Sheets

(51) Int. Cl.
   *G06Q 20/32* (2012.01)
   *H04L 29/06* (2006.01)
   *G06F 16/901* (2019.01)
(52) U.S. Cl.
   CPC ............ *G06Q 40/02* (2013.01); *H04L 63/06* (2013.01); *H04L 63/10* (2013.01)
(58) Field of Classification Search
   USPC .................................................. 705/3–44, 50
   See application file for complete search history.

(56) References Cited

U.S. PATENT DOCUMENTS

| | | | | |
|---|---|---|---|---|
| 8,510,800 | B2* | 8/2013 | Ganz ..................... | G06F 21/128 709/203 |
| 8,595,116 | B1* | 11/2013 | Bettinger, II .......... | G06Q 40/06 705/36 R |
| 8,625,838 | B2* | 1/2014 | Song ...................... | G06F 21/33 382/100 |
| 8,826,383 | B2* | 9/2014 | Ganz ..................... | G06F 21/128 709/203 |
| 2010/0017339 | A1* | 1/2010 | Cody ..................... | G06Q 40/02 705/36 R |
| 2010/0250410 | A1* | 9/2010 | Song ...................... | G06F 21/33 705/30 |
| 2014/0019367 | A1 | 1/2014 | Khan et al. | |
| 2014/0101052 | A1* | 4/2014 | Song ...................... | G06F 21/33 705/44 |
| 2014/0214640 | A1 | 7/2014 | Mallikarjunan et al. | |
| 2014/0229380 | A1* | 8/2014 | Duncan ............. | G06Q 20/40145 705/44 |
| 2014/0304094 | A1 | 10/2014 | Reddy et al. | |
| 2015/0016697 | A1 | 1/2015 | Kerr | |
| 2015/0066768 | A1* | 3/2015 | Williamson ......... | G06Q 20/405 705/44 |
| 2015/0254657 | A1* | 9/2015 | Bondesen ............ | G06Q 20/227 705/44 |

OTHER PUBLICATIONS www.patentlyapple.com, Mar. 6, 2015, A Major Apple Pay Patent Surfaces in Europe that's Focused on Fighting Fraud.
Jones, M. & Hardt, D. (2012). The oauth 2.0 authorization framework: Bearer token usage (No. RFC 6750) IETF ISSN: 2070-1721.

* cited by examiner

IdM Account Table

| IdM ID | Provisional Account No. | IDM Controls | Provider Name |
|---|---|---|---|
| EU898XDV | 111987 | Passed | Acme |
| EU898XDV | 111988 | Passed | Acme |

FIG. 7

Provider Account Table

| User ID | IdM ID | Verified | Master Account No. | Provisional Account No. | Expiration | Provider Controls | IdM Provider |
|---|---|---|---|---|---|---|---|
| WE90SFFV | EU898XDV | True | 10000234 | 111987 | 2/12/2016 | Passed | SecureID |
| WE90SFFV | EU898XDV | True | 10000234 | 111988 | 2/24/2016 | Passed | SecureID |

FIG. 8

Provider Authorization Table

| Amount | Login Verified | Trans Token Verified | Bank Controls Passed | IDM Controls Passed | Biometric Auth | Device Auth | Proximity Auth | Transaction Receiver Pre Auth | Transaction Post Transaction Auth |
|---|---|---|---|---|---|---|---|---|---|
| <$5000 | Required | Required | Required | Optional | Optional | Optional | Optional | Optional | Required |
| $5000-$10000 | Required | Required | Required | Optional | Optional | Required | Optional | Optional | Required |
| $10000+ | Required | Required | Required | Required | Required | Required | Required | Required | Required |

FIG. 9

Provider Transaction Table (Initial State)

| Provisional Account No. | Transaction Token | Private Key |
|---|---|---|
| 11198 | 67847493uj3 | 89Euis8604566 |

FIG. 10

IdM Transaction Table (Initial State)

| Provisional Account No. | Transaction | Public Key |
|---|---|---|
| 11198 | 67847493uj3 | 7EsW3466 |

FIG. 11

SYSTEMS AND METHODS FOR ISSUANCE OF PROVISIONAL FINANCIAL ACCOUNTS TO MOBILE DEVICES

BACKGROUND

The present invention relates generally to the field of electronic payment transactions, and more particularly, to systems and methods for securely creating provisional financial accounts that enable electronic payment transactions while minimizing the risk of compromising sensitive data.

The use of portable electronic devices to conduct financial transactions is growing in popularity. Current systems store sensitive customer information to the electronic device itself, including credit card numbers, debit card numbers, or customer identifying information. This presents a risk if the portable electronic device is lost or compromised. Additionally, new technologies have changed customer expectations with regard to the amount of time it takes to establish a new account. In particular, customers expect to have the ability to conveniently and securely establish a new account within minutes using portable electronic devices.

When opening a new account, however, financial service providers must have sufficient time and information to verify a customer's identity and the authenticity of portable electronic devices used to conduct payment transaction. Thus, new technologies and the accompanying customer expectations present a risk to financial service providers. It would, therefore, be advantageous to provide systems and methods that permit secure, convenient creation of accounts used to conduct payment transactions with portable devices while also minimizing the risk of compromising sensitive customer data.

Accordingly, it is an object of the present invention to provide systems and methods that enable the convenient, prompt, and secure creation of provisional accounts that can be used to conduct payment transactions through portable electronic devices. The provisional accounts do not include sensitive customer data such that, if the electronic device or provisional account were compromised, it would not permit direct access to a consumer's financial accounts. In the event of a security breach, the provisional account can be cancelled and a new account issued to mitigate risk to the consumer.

SUMMARY

According to one embodiment of the invention, a system and method of creating a provisional account is provided. The method includes receiving by a computing device associated with a provider, customer verification data and customer device fingerprint data. The provider computer device performs a verification analysis using the verification data and a device fingerprint analysis using the device fingerprint data. The provider computing device receives a client access message containing redirect data and an authorization request for an identity management service to access the provider computer device. The provider computing device generates an access decision message indicating an approval or a disapproval of the authorization request. If the authorization request is approved, the access decision message includes access data. The provider computing device receives an activation message containing activation data and a provisional account number. In response, the provider computer device generates an account authorization message containing an initial transaction token.

In one aspect of the invention, the provider computing device performs an authorization analysis after the verification analysis and device fingerprint analysis and before generating the access decision message. In further aspects of the invention, the client access message is received from a consumer computing device; the access decision message is transmitted to the consumer computing device; the account authorization message is received from an identity management service computing device; and the account authorization message is transmitted to the identity management service computing device.

According to yet other aspects of the invention, the access decision message includes error data if the authorization request is disapproved; the access data comprises an access token; and the account authorization message further comprises an offline security key.

In some embodiments, the verification analysis entails performing a context awareness analysis and/or biometric authorization. The device fingerprint analysis in some embodiments entails performing device identification matching and/or historical transaction data fingerprinting. According to one feature of the invention, the provider computing device generates an account table that includes a provisional account number, a provisional account expiration date, and a consumer financial account number. The provider computing device may also generate a provider transaction table that includes a provisional account number, transaction token, and a private encryption key. The identity management service computing device may generate an identity management service transaction table that includes a provisional account number, a transaction token, and a private encryption key.

One embodiment of the invention includes the step of providing a computing device associated with an identity management service. The identity management service computing device receives an account issue request message from a consumer computing device and generates a redirect message containing redirect data. The redirect message is transmitted to the consumer computing device. The identity management computing device also receives an access status message from the consumer computing device and generates a provisional account as well as an account activation message containing activation data, including a provisional account number. The account activation message is transmitted by the identity management service computing device to the provider computing device, and in return, receives a provisional account authorization message. The provisional account is transmitted to the consumer computing device through a provisional account issue message.

In one aspect of the invention, the consumer computing device generates the account issue request message containing account initialization data and transmits the account issue request message to the identity management service computing device. The consumer computing device receives a redirect message containing redirect data from the identity management service computing device, and the consumer computing device generates a client access message that is transmitted to the provider computing device. The consumer computing device receives an access decision message transmitted by the provider computing device and generates an access status message that is transmitted to the identity management service computing device. The consumer computing device also receives a provisional account issue message from the identity management service computing device.

BRIEF DESCRIPTION OF THE DRAWINGS

Features, aspects, and advantages of the present invention are better understood when the following detailed description of the invention is read with reference to the accompanying figures, in which:

FIG. 7 is an exemplary Identity Management Service account table;

FIG. 8 is an exemplary provider account table;

FIG. 9 is an exemplary provider authorization table;

FIG. 10 is an exemplary provider transaction table; and

FIG. 11 is an exemplary Identity Management Service transaction table.

DETAILED DESCRIPTION

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete and will fully convey the scope of the invention and enable one of ordinary skill in the art to make, use, and practice the invention.

As used herein, the term financial service provider ("FSP") generally describes the person or entity providing financial account services. The term financial service provider is used interchangeably with the terms provider, bank, or financial institution. The term account generally denotes a business arrangement providing for regular dealings between the provider and customer. The term customer is intended to generally describe an individual or entity that utilizes an account or purchases products and services from a provider. The term customer may be used interchangeably with the terms consumer, client, or user.

Disclosed herein are systems and methods for creating and issuing a provisional financial transaction account to a portable computing device. A computing device associated with a financial service provider receives verification data as well as consumer computing device fingerprint data. The verification data is utilized to authenticate the consumer's identity, and the device fingerprint data is used to authenticate the consumer computing device. The consumer computing device transmits a message to an identity management service requesting that a provisional account be created. The identity management service redirects the consumer computing device to the financial service provider's computer system to request an access credential, such as authorization code or token, used in accessing the provider's computer system. The provider's computer system approves or disapproves the authorization request and transmits an access decision message to the consumer computing device. The consumer computing device transmits an access status message to the identity management service, and the identity management service obtains the access credential and creates the provisional account. The identity management service transmits the provisional account to the consumer computing device and the provider computer system. The provider computer system returns an account authorization message that can include an initial transaction token and a security key used in conducting payment transactions using the provisional account.

Figure 1:
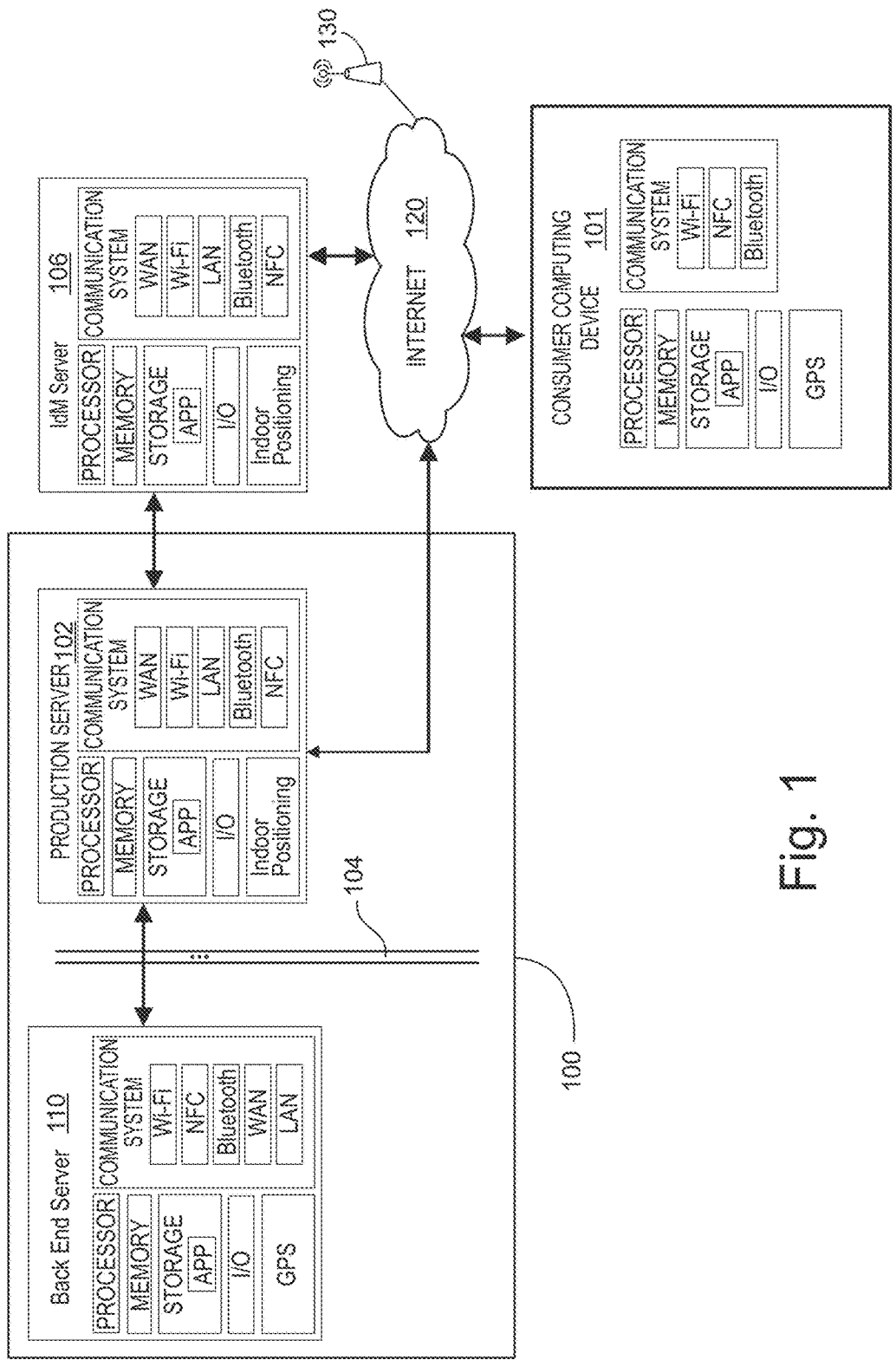
FIG. 1 is a diagram of a provisional account creation system according to one embodiment of the invention.

As shown in FIG. 1, a hardware system configuration according to one embodiment of the present invention generally includes a computing device 101 (e.g., an Internet-enabled device) operated by a consumer, a computer system associated with a provider 100, and an identity management service 106 ("IdM"). The provider's computer system 100 may include one or more network computing devices, such as a production server 102, back-end server 103, a firewall 104, and one or more personal computing devices (not shown) operated by the provider associates or employees. Likewise, the IdM service 106 can include one or more network computing devices, such as a server, as well as one or more personal computing devices.

Figure 2:
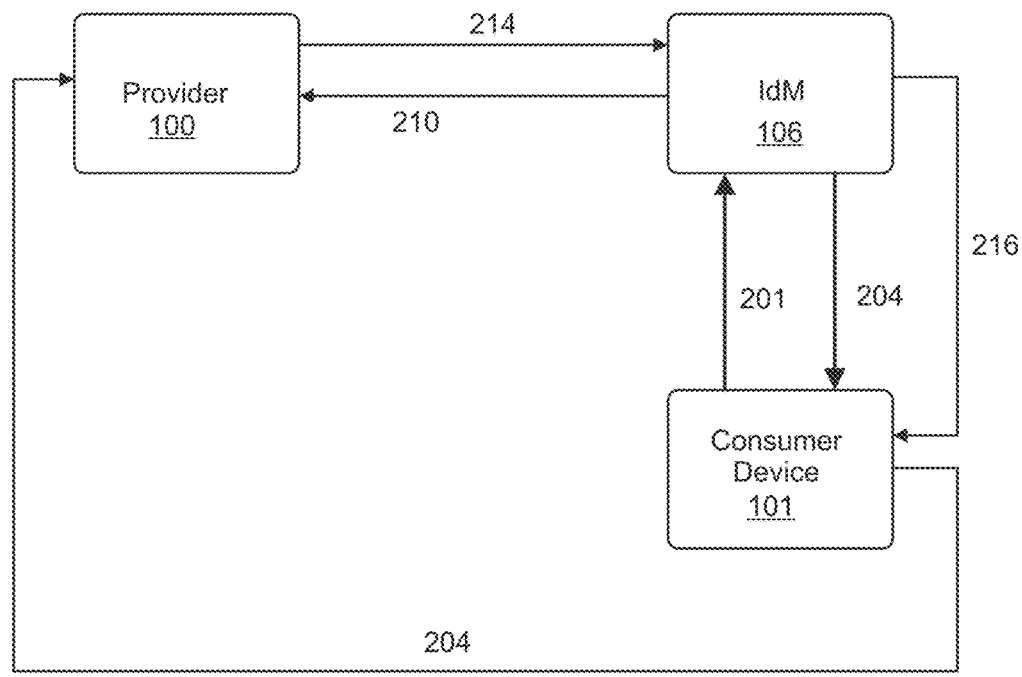
FIG. 2 is an exemplary data flow diagram according to one embodiment of the invention.

A functional configuration according to one embodiment of the invention is illustrated in FIG. 2 and depicts data flow between various computing devices used to implement the invention. The embodiments shown in FIGS. 1-2 are not intended to be limiting, and one of ordinary skill in the art will recognize that the system and methods of the present invention may be implemented using other suitable hardware or software configurations. For example, the system 100 may utilize only a single server implemented by one or more computing devices or a single computing device may implement one or more of the consumer computing device 101, production server 102, back-end server 103, firewall 104, IdM server 106, and/or associate computing devices. Further, a single computing device may implement more than one step of the method described herein; a single step may be implemented by more than one computing device; or any other logical division of steps may be used.

Any suitable computing device can be used to implement the consumer computing device 101, the components of the provider's computer system 100, or the IdM 106. The consumer computing device 101, the provider's servers 102 & 103, the firewall 104, the IdM 106, and the associate computing devices may include a processor that communicates with a number of peripheral subsystems via a bus subsystem. These peripheral subsystems may include a memory subsystem (e.g., random access memory), a storage subsystem (e.g., optical, magnetic, or solid-state storage), user input and output subsystems (e.g., a keyboard, mouse, computer monitor, touch-screen display, microphone, or speaker), a networking subsystem, a communication subsystem, and a Global Positioning System ("GPS"). By processing instructions stored on a storage device or in memory, the processors may perform one or more steps of the methods described herein. Any type of storage device may be used, including an optical storage device, a magnetic storage device, or a solid-state storage device.

It should be understood by those skilled in the art that although the present disclosure refers generally to GPS devices, the term GPS is being used expansively to include any satellite-based navigation system, such as the Galileo system, the GLONASS system, or the BeiDou Satellite Navigation System. Those skilled in the art will also recognize that other types of positioning systems can be used to implement the present invention, including, for example, radiolocation systems using the time difference of arrival ("TDOA") method, the angle of arrival ("AOA") method, or signature-based location methods.

Typically, the consumer computing device 101 accesses the provider's computer system 100 over the Internet 120 in the normal manner—e.g., through one or more remote connections, such as a Wireless Wide Area Network ("WWAN") 130 based on 802.11 standards or a data connection provided through a cellular service provider. These remote connections are merely representative of a multitude of connections that can be made to the Internet 120 for accessing the provider's computer system 100.

In a preferred embodiment, the consumer computing device 101 is a portable electronic device that includes an integrated software application configured to operate as a user interface and to provide two-way communication with the provider's computer system 100. The portable electronic device can be any suitable type of electronic device, including, but not limited to, a cellular smartphone, a tablet computer, or a personal data assistant. As another example, the portable electronic device can be a larger device, such as a laptop computer. The portable electronic device can include a screen and one or more buttons, among other features. The screen can be a touch screen that includes a tactile interface.

The software application integrated with the consumer computing device 101 is program, function, routine, applet, or similar module that perform operations on the computing device to implement the steps of the methods disclosed herein. For example, the application integrated with the consumer computing device 101 may be a financial account application, such as a banking application, a digital wallet application, a merchant loyalty account application, or any other suitable application configured for processing payment transactions. The consumer computing device application provides a user interface that outputs data and information to, and accepts inputs from, a user. Types of data and information processed by the applications include text, images, audio, video, or any other form of information that can exist in a computer-based environment. The user interface can include various display screens that output data to a user as well as functions for accepting user inputs and commands, such as text boxes, pull-down menus, radio buttons, scroll bars, or other suitable functions known to one of ordinary skill in the art.

The integrated application interfaces with a communication subsystem to provide for a secure connection with other electronic devices. Possible connections include a local area network, a wide area network, an intranet, an Internet connection, a mobile telephone network, a personal area network, or any other suitable connection. The one or more communication subsystems may include a wireless communication system configured to communicate through radio frequency ("RF"), WI-FI (e.g., wireless local area network products based on the Institute of Electrical and Electronics Engineers 802.11 standards), near field communications ("NFC"), BLUETOOTH®, or BLUETOOTH Low Energy ("BLE"). In one example, a consumer has the ability to make purchases with the consumer computing device 101 by using NFC to wirelessly establish a secure link with a payee computing device (e.g., a point of sale terminal or other computing device operated by a retailer).

A consumer is able to link multiple personal financial accounts to the consumer computing device 101, including checking and savings accounts or credit card accounts. In this manner, a consumer is able to utilize software applications integrated with the consumer computing device to purchase goods and services using any of the linked financial accounts. The integrated application can also provide other functions permitting the consumer to receive account balance information, make withdrawals, or deposit funds, among other features.

A consumer initiates the creation of provisional account by selecting an icon on a screen of the consumer computing device 101 to open the integrated software application. Upon opening the integrated software application, the consumer identity is authenticated by performing a verification analysis, and the consumer computing device 101 is authenticated by performing a device fingerprinting analysis. The verification analysis utilizes one or a combination of verification techniques, such as: entry of consumer credentials (e.g., a username and password); biometric authentication; context awareness analysis; identity authorization ("IDA"); or nondocumentary verification.

Verification data utilized in the verification analysis can be gathered from inputs entered by the consumer or from sensor components of the consumer computing device 101. Examples of useful verification data collected from the consumer computing device 101 include: context information, like geographic location data generated by an integrated GPS device; cancellable biometric information, like fingerprints, photographic images of the consumer, or voice recordings; or identity authentication information, such as token or cookie, generated during a prior login to the provider's computer system 100. Examples of verification data input by a consumer include, but are not limited to, consumer credentials or responses to questions posed during IDA, as discussed in more detail below. Verification data is transmitted to the provider computer system 100 for use in performing the verification analysis.

Figure 3:
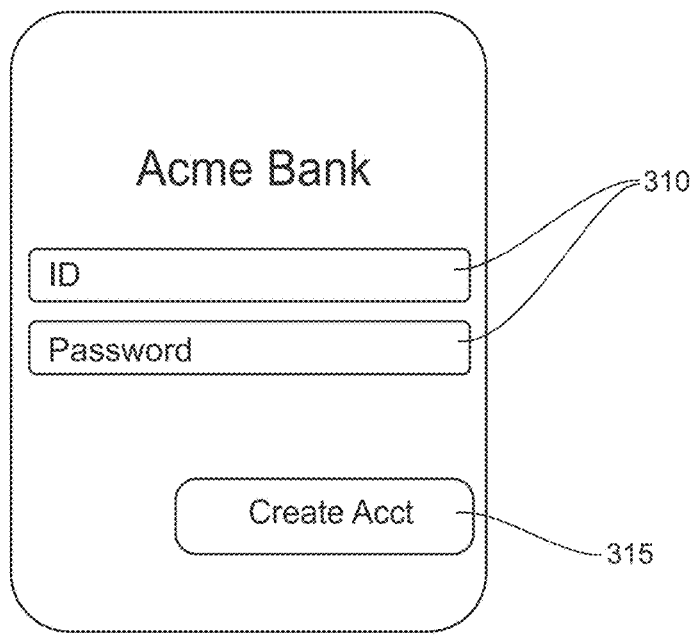
FIG. 3 is an exemplary display screen for entering identification credentials.

The verification analysis optionally begins with the consumer entering a username and password into text boxes, such as the text boxes 310 shown on the exemplary display screen in FIG. 3. If the username and password are correct, the system proceeds to other verification techniques, such as context awareness analysis. Context awareness analysis examines the circumstances and activities of the customer to improve security. In one embodiment, the consumer computing device 101 transmits GPS data that reflects the current location of the consumer computing device 101. If the GPS location data indicates the device 101 is outside the state or country of residence of the consumer computing device 101, the authentication may fail. Alternatively, the financial service provider can contact the consumer by phone or email and request that the consumer verify the location data before continuing with the provisional account creation process.

IDA techniques present the consumer with a series of questions about the consumer's personal background or financial accounts that only the consumer would know. As an example, a multiple choice question is generated using former addresses listed on a consumer's credit report. The answer choices to the question include one former address and four randomly chosen addresses. The question is presented to the consumer, and selection of the correct answer is a positive indicator that the consumer's identity is authentic. As another example, the consumer is asked about information relating to his or her financial accounts, such as the identity of the source for any recurring direct deposits (e.g., paychecks from an employer).

Nondocumentary verification techniques include verifying a consumer's phone number or email by contacting the consumer. One exemplary technique is to send the consumer an email containing hyperlink that takes the consumer to a webpage where the consumer confirms receipt of the email. This provides some assurance that the email account exists and that the consumer has rights to the account.

Biometric authentication captures biometric data from the consumer, such as a finger print or photograph, and compares the captured biometric data to known values. Biometric data can be secured by making it "cancellable," which refers to a systematic and repeatable distortion of the biometric information through known techniques, like salting or noninvertible transforms. The distorted biometric information is securely stored in the consumer computing device 101, the financial service provider system 100, and/or the IdM service 106. To verify a consumer's identity, the consumer inputs a fingerprint or captures a current picture of themselves, which is then compared to biometric information previously stored on the provider system 100, consumer computing device 101, or IdM service 106.

Device fingerprinting analysis authenticates the consumer computing device 101 using one or a combination of device fingerprinting techniques that utilize various types of device data to distinguish and identify a particular device. The distinguishing device data, or device fingerprint data, is stored to a database on the provider computing system 100. During device fingerprinting analysis, the consumer computing device 101 transmits the current device fingerprint data to the provider computer system 100, which compares the current data to a known baseline value. If the information matches, the match is a positive indicator that the device is authentic. Device fingerprinting techniques include, but are not limited to: device ID matching; audio fingerprinting; accelerometer fingerprinting; historical transaction data fingerprinting; and remote attestation. Device fingerprint data includes information such as a device identification number, an audio fingerprint, or a historical transaction data fingerprint.

Figure 4:
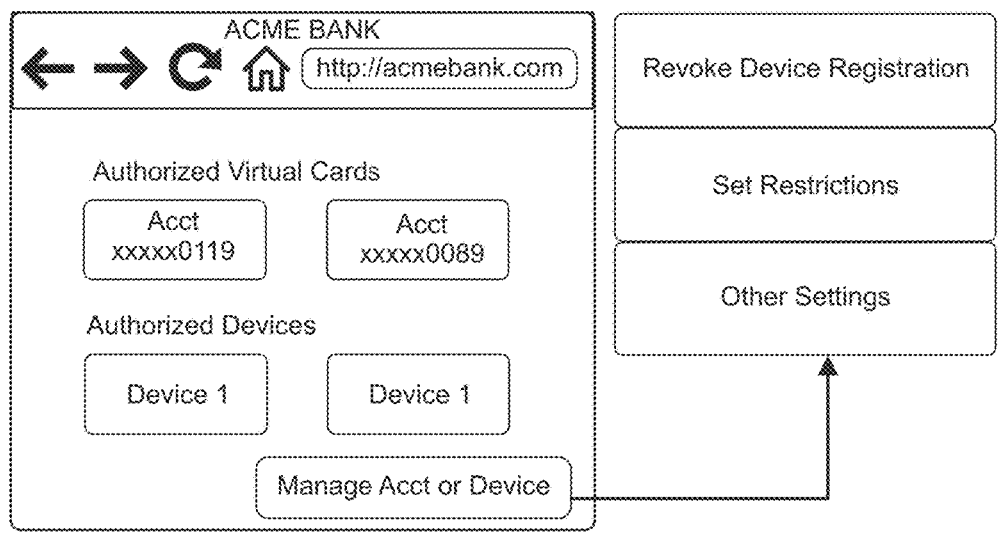
FIG. 4 is an exemplary display screen for managing a provisional account.

A particular consumer computing device 101 can be preregistered with the financial service provider by entering device data into an online account portal administered by the provider. An exemplary user-interface display screen for managing account settings and device registrations is shown in FIG. 4. Device ID matching can be understood with reference to the following example. A consumer accesses the online account portal and enters a unique device identification number, such as a device Electronic Serial Number ("ESN") for CDMA cellular telephones or the International Mobile Equipment Identifier ("IMEI") for GSM cellular telephones. The device identification number is stored to the provider system 100. During device fingerprinting analysis, the consumer computing device 101 transmits its current ESN or IMEI to the provider system 100, which then compares the information to the preregistered value.

In other embodiments, the input and output components of the consumer computing device 101 are used to create a device fingerprint, such as the speaker-microphone system or the device accelerometer. To create an audio fingerprint, the speaker plays an audio signal at a predetermined intensity that is recorded using the microphone. The recorded intensity is divided by the played intensity to determine the device feedback ratio, which is unique to the particular device. A baseline feedback ratio is measured and stored to the provider computer system 100. During the device fingerprint analysis, the consumer computing device 101 plays and records a brief sound pulse to determine the feedback ratio, which is compared to a baseline value known to the financial service provider. An example of an accelerometer fingerprint measures the consumer computing device's 101 accelerometer sensitivity and offset. The sensitivity and offset are measured when the device 101 is at rest and the acceleration is equal to the force of the Earth's gravity, a well-known baseline value. To authenticate the device fingerprint, the integrated software application asks the consumer to place the device on a flat surface while the accelerometer sensitivity and offset are measured and compared to known values stored on the financial service provider computer system 100.

In yet other embodiments, the device fingerprint data can be a historical data fingerprint, which is a unique device number that is calculated by hashing transaction data and/or sensor data gathered from the consumer computing device 101. In one embodiment, the system generates a historical data fingerprint by running a locality sensitive hashing technique ("LSH") on a cumulative transaction amount gathered from NFC or BLE sensor data or on cumulative transaction distances gathered from the consumer computing device GPS. The resulting device fingerprint data is stored to a database on the provider computer system 100. The cumulative transaction amount is the sum of all transaction amounts over time, and the cumulative distance is the sum of geographic distances between all transactions over time computed using, for example, the "Haversine" formula. The cumulative transaction amount and cumulative distance are stored to a database on the consumer computing device 101 and continuously updated with each new payment transaction.

To verify the consumer computer device 101 authenticity, the current transaction amount fingerprint or distance fingerprint is calculated for the device to be authenticated, and the calculated value is compared against the value stored on the provider's computer system 100. If the calculated value is less than the stored value, then the comparison yields a negative indicator of authenticity since negative transaction amounts or negative distances are unlikely unless, for instance, the consumer computing device 101 memory has been deleted or the device has been tampered with or altered in some fashion.

The consumer computing device 101 is optionally authenticated using remote attestation fingerprinting. Remote attestation creates a one-way hash summary of the consumer computing device 101 hardware and software configuration that allows the provider's system 100 to verify whether the configuration has changed. A change in the device configuration is a negative authentication indicator. Hashing techniques apply a hashing algorithm to known data to create a one-way hash value. Any suitable hashing algorithm can be used, including, but not limited to, SHA-1 or SHA-2 algorithms. A one-way hash value is preferably a value of fixed length that is unique to the known data. In other words, if the known data (i.e., data representing the device hardware or software configuration) is changed in any respect, the hash value will also change. The hash value, thus, acts as a fingerprint for the known data. As an example, the known data can be a text file created during boot up that lists the operating system software build and model numbers for hardware components. If the operating system software or hardware configuration is altered, then the text file and resulting one way hash will be changed.

Figure 5:
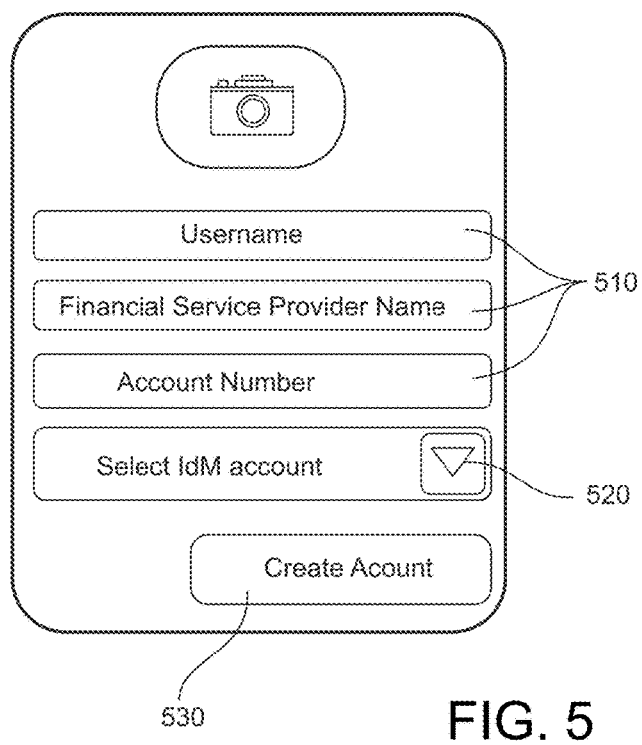
FIG. 5 is an exemplary display screen for entering data used in creating a provisional account according to one embodiment of the invention.

After the consumer's identity and authenticity of the consumer computing device 101 are verified, the software application prompts the consumer to enter some or all of the account initialization data required to create a provisional account. The consumer inputs account initialization data into text boxes 510, such as those shown on the exemplary display of FIG. 5, and selects an authorized IdM service 106 using a pull down menu 520. The consumer selects the "Create Account" function 530 to transmit to the IdM service 106 an account issue request message 201 containing account initialization data, as shown in FIG. 2. The account issue request message 201 includes, among other account initialization data, the consumer's name, financial service provider name, account number, provisional account identifier, the consumer's tax identification number, the consumer's employer, preferred payment types, consumer controls and settings, or any other information useful for facilitating payment transactions or authenticating the consumer's identity.

Through the controls and settings, consumers can specify preferences and payment conditions, such as whether or not the account is authorized to make recurring payments, a maximum number of authorized payment transactions in a given time period, or geographic restrictions on payment transactions. To illustrate, a consumer can create a budget by authorizing only a certain dollar amount of transactions in a given month. Or a parent can impose geographic restrictions, spending limits, or merchant restrictions on a provisional account utilized by a minor child.

The IdM service 106 is an account that permits authentication of the consumer's identity and management of the consumer's preferences or other information. Types of IdM accounts can include, but are not limited to, social media accounts, messenger applications, employer accounts, cloud storage accounts, or merchant loyalty accounts. Examples of IdM services include Microsoft Azure®, Apple iCloud®, Facebook Connect®, Twitter®, or Google®.

The IdM service 106 can provide information useful for ensuring the security of the transaction, such as biometric data, a personal identification number ("PIN"), gesture recognition information, or federated identification information. The IdM service 106 may also provide information to the consumer that is relevant to a payment transaction, such as merchant ratings; cost comparisons; and payment transaction rules, restrictions, controls, or other settings.

The IdM service 106 can be registered with the financial service provider to ensure the IdM service 106 is a trusted intermediary between the consumer and the provider. Once registered, the IdM service 106 appears in the pull down menu 520 in FIG. 5 for use in creating and utilizing a provisional account. The consumer can register the IdM service 106 by, for instance, logging into an online consumer account portal administered by the provider and specifying the IdM service 106 name and other registration information, such as the client type, a uniform resource identifier ("URI"), access level, the name of software applications associated with the IdM service 106, a website address, a description of the service, or any other information useful in authenticating the IdM service 106 and facilitating payment transactions. Alternatively, the financial service provider registers a limited number of trusted IdM services 106 that can be associated with a provisional account.

Once registered, the financial service provider issues the IdM service 106 a client identifier that is used to identify and authenticate the IdM service 106 when creating or using a provisional account. The IdM service 106 client type is defined with respect to its ability to authenticate securely with the financial service provider's system. The client type can be Confidential for IdM services 106 capable of maintaining the confidentiality of its credentials or Public for clients incapable of maintaining confidentiality, such as native applications installed on the consumer computing device 101 or web-browser applications. The URI is a string of characters used to identify the name and location of an abstract or physical resource, such as virtual or physical server.

Turning to the embodiment depicted in FIG. 2, after receiving the account issue request message 201, the IdM service 106 transmits a redirect message 204 to the consumer computing device 101, which redirects the consumer computing device 101 to the provider computer system 100. The purpose of the redirect is to authenticate the consumer's identity and obtain an authorization grant for the IdM service 106 to access the consumer's financial accounts. Types of authorization grants include, but are not limited to, an authorization code, implicit authorization, consumer password credentials, or IdM service 106 credentials. Authorization can be better understood with reference to the simplified example shown in FIG. 6.

The IdM service 106 transmits a redirect message 204 to the consumer computing device 101 that redirects the device 101 to the provider computer system 100. During the redirect, the consumer computing device transmits a client access message 205 to the provider computer system. In one embodiment, the consumer computing device 101 is redirected to an authentication webpage administered by the financial service provider that permits the consumer to input authentication information, such as a username and password. An exemplary authentication webpage is shown in FIG. 3. The consumer selects the "Create Acct" function 315 to submit the username and password to the provider computer system 100 and to confirm the authorization request.

The consumer may also be prompted to confirm authorization through a dialog box or other graphical user interface. The consumer authorization can be included in the client access message 205 transmitted by the consumer computing device 101 to the provider computer system 100, or the consumer authorization can be transmitted to the provider computer system 100 as a separate message. In some embodiments, the consumer authorization is implicitly assumed by virtue of the consumer initiating the provisional account creation process and selecting the Create Acct function to transmit an account issue request message 201.

The redirect message 204 and the client access message 205 include redirect data, such as: an authorization request from the IdM service 106; an IdM service client identifier; the required response type (i.e., an authorization code, implicit authorization, etc.); the access level; and an IdM service URI; among other data. The consumer identity and device are authenticated, and the consumer confirms whether to grant or deny the authorization request from the IdM service 106. A streamlined consumer and device authentication process, such as entry of a username and password, can be used if verification analysis and device fingerprinting analysis were previously performed upon startup of the integrated software application. Otherwise, verification analysis, device fingerprinting analysis, and/or recommendation analysis can be performed upon redirect, or in some embodiments, the consumer's identity and device 101 authenticity can be verified at a later time after provisional account is created but before the account is activated.

The provider computer system 100 performs a client authorization analysis using data from the client access message 205, consumer authorization, and the results of the verification analysis and device fingerprint analysis. The client authorization analysis determines whether a customer's identity and device authenticity have been positively verified, thereby permitting the customer to create a provisional account with or without certain restrictions. The authorization analysis further determines whether or not to grant the IdM service 106 authorization to access a consumer's account. The analysis utilizes information from the verification analysis, the device fingerprinting analysis, and a provider risk model. In one embodiment, the client authorization analysis can be implemented as a feature-driven model based on a set of logical rules provided by the risk model.

The provider risk model provides rules, model parameters, and other inputs to the client authorization analysis to adjust the recommendations so as to accommodate the provider's risk profile. As an example, a provider with a conservative risk profile may deem that any customer with a device that fails any one of the device fingerprinting techniques is not permitted to initiate a provisional account. Alternatively, the provider risk model can instead provide that if the historical transaction data fingerprinting fails but the device ID matching passes, the consumer will be permitted to initiate a provisional account with certain transaction amount limitations that can be later raised or eliminated if the consumer provides more information or completes additional verification techniques.

If the IdM service 106 has been registered with the provider and is recognized as a trusted source, the authorization request is granted, and the provider computer system 100 transmits to the consumer computer device 101 an access decision message 608 containing access data. The access decision message 608 also redirects the consumer computing device 101 back to the IdM service 106 using the IdM service URI. The access data includes: an authorization token or other credential (i.e., an access code); a consumer identifier; a consumer computer device identifier; an IdM service client identifier; a duration that specifies when the authorization token or other credential expires; an access level defining the scope of permitted access (i.e., what information can the IdM service 106 access on the provider computer system 100); a consumer financial account number; consumer financial account routing information; consumer computing device fingerprint data; known consumer biometric information (i.e., a biometric token) to be compared against biometric information input by the consumer to the computing device 101; or any other information useful for authenticating the IdM service 106 and consumer and for providing a secure communication session.

The authorization request can be denied, for instance, if the IdM service 106 is not registered with the provider, the consumer affirmatively denies the request, the access level in the client access message 205 exceeds the permitted access level determined by the provider computer system 100, or the client access message 205 contains invalid or incomplete data. To illustrate, client access message 205 may request write access to a consumer's savings account whereas the IdM service 106 is only authorized to write data to a consumer's checking account, thereby leading to a denial of the authorization request. If the authorization request is denied, the provider computer system 100 optionally includes error data in the access decision message 608 transmitted to the consumer computing device, which in turn relays the information to the IdM service 106. The error data indicates the reason why the authorization request was denied.

The consumer computing device 101 transmits an access status message 612 to the IdM service 106 indicating whether the IdM service 106 authorization request was granted or denied. The access status message 612 contains IdM authorization data, including: the authorization token (or code) for use in communicating with the provider computer system 100; the IdM service URI; an IdM service identifier; a provider identifier; a token duration; an IdM access level; a consumer financial account number; consumer financial account routing information; or other information included in the access decision message 608.

The IdM service 106 creates the provisional account and transmits a provisional account activation message 210 to the provider computer system 100. The provisional account activation message 210 includes activation data, such as a provisional account number; a provisional account expiration date; and access data, like the IdM client identifier, an IdM access level, an authorization token or code; or other access data and information useful for facilitating payment transactions and authenticating the IdM service 106 or consumer.

The provider responds to the provisional account activation message 210 by transmitting to the IdM service 106 a provisional account authorization message 214 containing provisional account authorization data. Provisional account authorization data can include, for example, an initial transaction token and an offline security key. The IdM service 106 transmits a provisional account issue message 218 to the consumer computing device 101. The provisional account issue message 218 can include activation data and account authorization data. In cases where the consumer computing device 101 is being used to conduct a financial transaction but does not have Internet connectivity, the consumer computing device can transmit the transaction token and an offline security key to a payee computing device (e.g., merchant point of sale device), which in turn transmits the information to the provider computer system 100 to facilitate transaction authorization.

Figure 6:
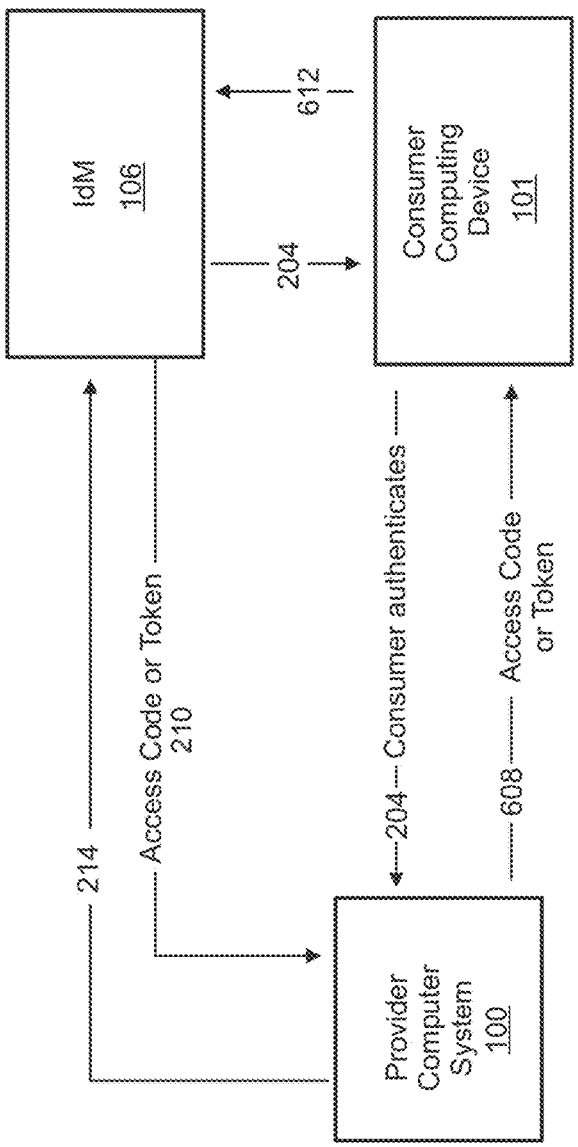
FIG. 6 is data flow diagram illustrating the redirect authorization process.

Those of ordinary skill in the art will recognize that authorization grant procedure shown in FIG. 6 is not intended to be limiting, and any suitable method can be used to implement the inventive systems and methods. The system can be configured to utilize a variety authorization protocols, including the OAUTH protocols developed by OpenID® or Security Assertion Markup Language ("SAML"). In some embodiments, the access token is not transmitted directly to the IdM service 106 with the access status message 612 but instead is saved locally to the consumer computing device 101. If the authorization request is granted, the IdM service 106 responds by returning a webpage (i.e., an html document with an embedded script) capable of processing the access decision message 608 that includes the access token. The consumer computing device 101 executes the script and extracts the access token that is transmitted separately to the IdM service 106.

According to another embodiment, instead of transmitting an authorization token to the consumer computing device 101, the provider computer system 100 can transmit an access code with the access decision message 608, and the access code is then transmitted to the IdM service 106. The IdM service 106 transmits the authorization code along with other access data to the provider computer system 100 and requests an authorization token used in establishing future communication sessions with the provider computer system 100.

In embodiments where there is a highly trusted relationship between the consumer computing device 101 and the IdM service 106, the IdM service 106 can utilize the consumer's identification credentials (i.e., username and password) to request an access token from the provider computer system 100. In yet other embodiments, the IdM service 106 can utilize its own access credentials issued during the registration process to request an access token directly from the financial service provider's computer system 100 in response to a request from a consumer. Although direct request methods have the advantage of being streamlined, these methods are less secure in that a third-party IdM service 106 is provided with credentials to access the provider's computer system 100.

The IdM service 106 communicates with the provider system 100 using transport hypertext transfer protocol secure ("HTTPS"); transport layer security protocols ("TLS") that implement asymmetric encryption techniques, such as the Rivest-Shamir-Adleman ("RSA") algorithm or Internet Key Exchange protocols, or PGP encryption protocols, among others; or any other suitable secure communication protocol. In one exemplary embodiment, the system utilizes symmetric key encryption. Communications transmitted by the consumer computing device 101 are encrypted using a cryptographic key known to both the consumer computing device 101 and the provider system 100. Upon receipt of a communication transmitted by the mobile computing device 101, the provider system 100 utilizes the cryptographic key to decrypt the message. The encryption is symmetric in that both the consumer computing device 101 and the provider system 100 utilize the same cryptographic key to encrypt and decrypt communications.

Communications between the consumer computing device 101 and the provider system 100 can also be encrypted using asymmetric encryption techniques. In a particular communication session between two devices, each device can utilize its own public-private cryptographic key pair. The cryptographic key pairs can be exchanged between devices during the initiation of a communication session. Alternatively, the encryption key pairs can be pre-installed on the computing devices prior to being placed into production.

During a communication session where the consumer computing device 101 transmits a communication to the provider system 100, the consumer computing device 101 first encrypts the communication using the provider system 100 public key. Upon receipt of the communication from the consumer computing device 101, the provider system 100 uses the corresponding provider system private key to unencrypt the communication. Conversely, if a computing device on the provider system 100 transmits a communication to the consumer computing device 101, the provider system 100 must first encrypt the message using a separate public key associated with the consumer computing device 101. The consumer computing device 101 unencrypts the communication received from the remote network device using a corresponding private key.

Turning again to FIG. 2, upon receiving an access token, the IdM service 106 creates a provisional account. The provisional account exists as a database record that is stored to the IdM service 106, the provider system 100, and to a secure element (e.g., an encrypted storage media or microchip) on the consumer computing device 101. The provisional account database record contains nonsensitive information such that, if the provisional account were compromised, it would not provide direct access to a consumer's financial accounts. In the event of a security breach, the provisional account can be quickly and conveniently cancelled and a new account reissued to mitigate risk to the consumer. The provisional account is transmitted to the consumer computing device 101 in the provisional account issue message 218 and to the provider computer system in an account activation message 210 that contains provisional account creation data, such as: a provisional account number; a provisional account expiration date; a provider identifier; a control flag indicating whether account controls have been established; and any other data useful for authentication or facilitating payment transaction using the provisional account.

After creating the provisional account, the IdM creates a database record in an IdM Account Table database that is stored to the IdM server 106. An exemplary IdM Account Table is shown in FIG. 7 and includes a separate database entry (shown as a row) for each provisional account with data fields for: an IdM identification number; provisional account number; a financial service provider identifier; and a flag indicating whether account controls have been established.

Upon receiving the provisional account activation message 210, the financial service provider computer system 100 creates a database record in a Provider Account Table database, an example of which is shown in FIG. 8. The Provider Account Table database maps the provisional accounts to a customer's corresponding financial account and includes data fields for: a consumer identification number; an IdM service identification number; a flag indicating whether the consumer identity and device authenticity have been verified; financial account number; provisional account number; provisional account expiration date; a flag indicating whether consumer controls exists; and a field indicating whether the IdM service 106 is a trusted source; as well as any other useful information for administering and utilizing a provisional account.

The provider computer system 100 also maps the provisional account to a Provider Authorization Table database that specifies the necessary security controls for a provisional account. An exemplary Provider Authorization Table is depicted in FIG. 9. For transactions of various amounts, the Provider Authorization Table indicates whether a consumer is required to provide a user name and password, a verified transaction token, consumer controls, or biometric authorization, among other security control measures. One of ordinary skill in the art will recognize that the exemplary Provider Authorization Table in FIG. 9 is not intended to be limiting, and additional controls can be specified according to a wide-variety of criteria. To illustrate, rather than specify required controls for various transaction amounts, the require controls can be specified according to whether a transaction is being conducted by the primary account holder or a secondary account holder.

In addition to security controls, provisional accounts may have various other controls, setting, and limitations that are eased as consumers provide additional information or indicia of reliability. For instance, new provisional accounts created following completion of one or two verification analysis techniques can be limited to use in transaction under a certain dollar amount. But if the consumer completes additional verification analysis techniques, the transaction amount limitations can be increased or eliminated.

In some embodiments, the provider computer system 100 creates a Provider Transaction Table such as the exemplary table shown in FIG. 10. The Provider Transaction Table includes the provisional account number, an initial transaction token, and a private encryption key. The IdM service 106 creates a corresponding IdM Transaction Table shown in FIG. 11 that similarly includes IdM transaction data, such as the provisional account number, the transaction token, and a public encryption key.

Although the foregoing description provides embodiments of the invention by way of example, it is envisioned that other embodiments may perform similar functions and/or achieve similar results. Any and all such equivalent embodiments and examples are within the scope of the present invention.

What is claimed is:

1. A computer-implemented method of issuing a provisional payment account comprising:
   (a) providing a computing device associated with a provider;
   (b) receiving, by the provider computing device, verification data and device fingerprint data;
   (c) performing, by the provider computing device, a verification analysis using the verification data;
   (d) performing, by the provider computing device, a device fingerprinting analysis using the device fingerprint data;
   (e) receiving, by the provider computing device, a client access message transmitted by a consumer computing device, wherein the access message contains redirect data comprising (i) an authorization request generated by an identity management service, (ii) an identity management service identifier, and (iii) identity management service access level data;
   (f) performing by the provider computing device, a client authorization analysis that comprises the step of authorizing the identity management service utilizing the identity management service identifier and identity management service identifier access level data;
   (g) generating, by the provider computing device in response to the client access message, an access decision message indicating an approval or a disapproval of the authorization request, wherein if the authorization request is approved, the access decision message includes access data comprising (i) an identity management service uniform resource identifier, and (ii) an authorization token;
   (h) receiving, by the provider computing device, an account activation message containing activation data, wherein the activation data comprises (i) a provisional account number generated by the identity management service, and (ii) the authorization token utilized to confirm approval of the authorization request;
   (i) generating, by the provider computing device, a Provider Account Table comprising (i) the identity management service identifier, (ii) the provisional account number, and (ii) a consumer account number correlated to the provisional account number; and
   (j) generating, by the provider computing device, an account authorization message containing an initial transaction token.

2. The method of claim 1, wherein:
   (a) the client access message is received from a consumer computing device;
   (b) the access decision message is transmitted to the consumer computing device;
   (c) the account authorization message is received from an identity management service computing device; and
   (d) the account authorization message is transmitted to the identity management service computing device.

3. The method of claim 1, wherein if the authorization request is disapproved, the access decision message includes error data.

4. The method of claim 1, wherein the access data comprises an access token.

5. The method of claim 1, wherein the account authorization message further comprises an offline security key.

6. The method of claim 1, wherein the verification analysis further comprises performing a context awareness analysis.

7. The method of claim 1, wherein the verification analysis further comprises performing biometric authentication.

8. The method of claim 1, wherein the device fingerprinting analysis further comprises performing device identification matching.

9. The method of claim 1, wherein the device fingerprinting analysis further comprises performing historical transaction data fingerprinting.

10. The method of claim 1, wherein the Provider Account Table further comprises a provisional account expiration date.

11. The method of claim 10 further comprising the step of generating, by the provider computing device, a provider transaction table comprising a provisional account number, transaction token, and a private encryption key.

12. A computer-implemented method of issuing a provisional payment account comprising:
   (a) providing a computing device associated with an identity management service;
   (b) receiving, by the identity management service computing device, an account issue request message;
   (c) generating, by the identity management service computing device, a redirect message containing redirect data comprising (i) an authorization request, (ii) an identity management service identifier, and (iii) identity management service access level data;
   (d) receiving, by the identity management service computing device, an access status message comprising an authorization token;
   (e) generating, by the identity management service computing device, a provisional account comprising a provisional account number;
   (f) generating, by the identity management service computing device, an account activation message containing activation data, wherein the activation data comprises (i) the provisional account number, and (ii) the authorization token;
   (g) generating, by the identity management service computing device, a provisional account issue message containing a provisional account number; and
   (h) receiving, by the identity management service computing device, a provisional account authorization message.

13. The method of claim 12 wherein:
   (a) the account issue request message is received from a consumer computing device;
   (b) the redirect message is transmitted, by the identity management service computing device, to the consumer computing device;
   (c) the access status message is received from the consumer computing device;
   (d) the account activation message is transmitted, by the identity management service computing device, to a provider computing device; and
   (e) the account authorization message is received from the provider computing device.

14. A system for processing an account application comprising:
   a first processor;
   a second processor;
   a third processor;
   a data storage device including a computer-readable medium having computer readable code for instructing the first processor, and when executed by the first processor, the first processor performs operations comprising:
(a) receiving verification data and device fingerprint data;
(b) performing a verification analysis using the verification data;
(c) performing a device fingerprinting analysis using the device fingerprint data;
(d) receiving the client access message transmitted by the second processor, wherein the access message contains redirect data comprising (i) an authorization request venerated by the third processor (ii) an identity management service identifier, and (iii) identity management service access level data;
(e) performing a client authorization analysts that comprises the step of authorizing the third processor utilizing the identity management service identifier and identity management service identifier access level data;
(f) generating an access decision message in response to the client access message indicating an approval or disapproval of an authorization request, wherein if the authorization request is approved, the access decision message includes access data comprising (i) an identity management service uniform resource identifier, and (ii) an authorization token utilized to confirm approval of the authorization request;
(g) transmitting the access decision message to the second processor;
(h) receiving an account activation message containing activation data, wherein the activation data comprises a (i) provisional account number generated by the third processor, and (ii) the authorization token;
(i) generating a Provider Account Table comprising (i) the identity management service identifier, (ii) the provisional account number, and (ii) a consumer account number correlated to the provisional account number;
(j) generating an account authorization message containing an initial transaction token; and
(k) transmitting the account authorization message to the third processor.

15. The system of claim 14 further comprising:
a data storage device including a computer-readable medium having computer readable code for instructing the second processor, and when executed by the second processor, the second processor performs operations comprising:
(a) generating an account issue request message containing account initialization data;
(b) transmitting the account issue request message to the third processor;
(c) receiving a redirect message containing redirect data from the third processor;
(d) transmitting the client access message to the first processor;
(e) receiving the access decision message transmitted by the first processor;
(f) generating an access status message;
(g) transmitting the access status message to the third processor; and
(h) receiving a provisional account issue message from the third processor.

16. The system of claim 15 further comprising:
a data storage device including a computer-readable medium having computer readable code for instructing the third processor, and when executed by the third processor, the third processor performs operations comprising:
(a) receiving the account issue request message transmitted by the second processor;
(b) generating the redirect message containing redirect data;
(c) transmitting the redirect message to the second processor;
(d) receiving from the second processor the access status message;
(e) generating a provisional account;
(f) generating the account activation message containing activation data;
(g) transmitting the account activation message to the first processor;
(h) generating a provisional account issue message containing a provisional account number;
(i) transmitting the provisional account issue message to the second processor; and
(j) receiving the account authorization message transmitted by the first processor.

17. The system of claim 14, wherein the first processor performs the further operations of:
(a) generating a provider transaction table comprising a provisional account number, transaction token, and a private encryption key.

18. The system of claim 17, wherein the third processor performs the further operation of generating an identity management service transaction table comprising a provisional account number, a transaction token, and a private encryption key.

* * * * *